March 10, 1953 F. W. McRAE 2,630,818
TEMPERATURE RELEASED CHECK VALVE
Filed April 24, 1947
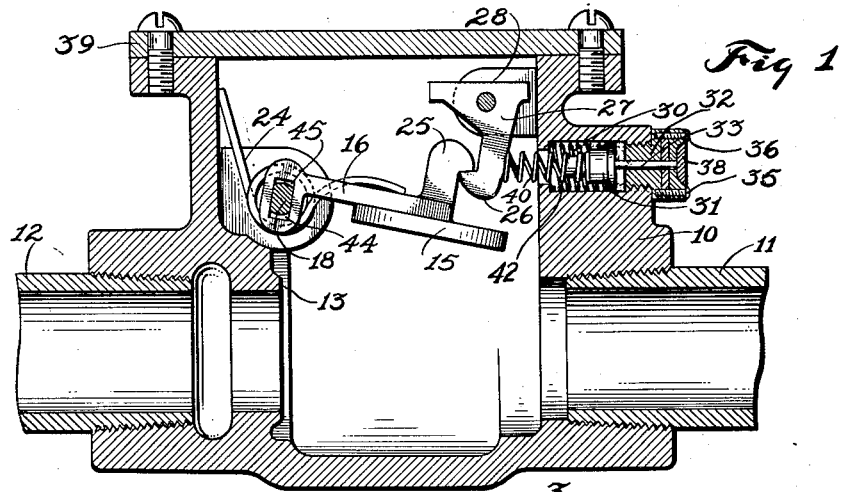
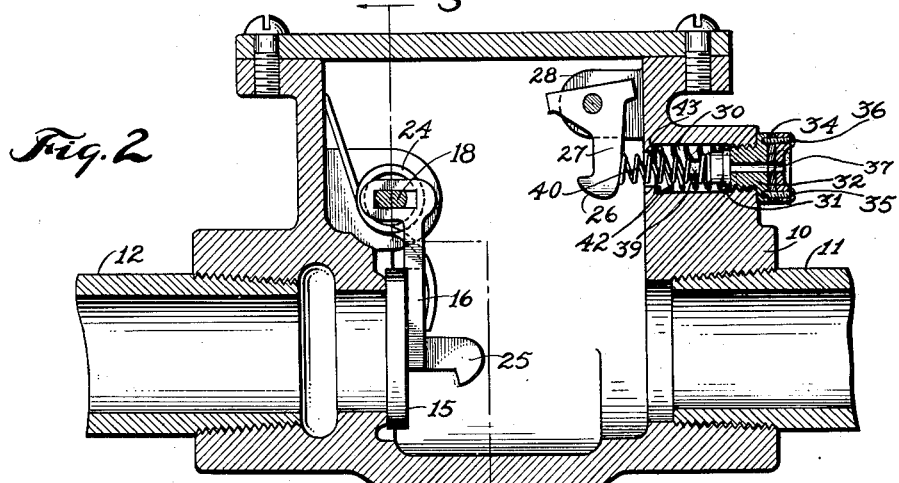
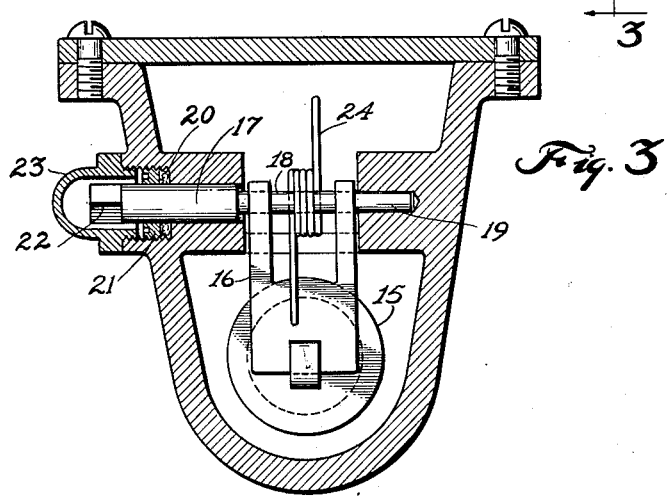
INVENTOR.
FRED W. McRAE
BY Hazard and Miller
ATTORNEYS Patented Mar. 10, 1953

2,630,818

UNITED STATES PATENT OFFICE 2,630,818

TEMPERATURE RELEASED CHECK VALVE

Fred W. McRae, Los Angeles, Calif.

Application April 24, 1947, Serial No. 743,609

10 Claims. (Cl. 137—75)

1

This invention relates to improvements in check valves.

A primary object of the invention is to provide an improved check valve adapted to be connected in a conduit used to convey gas, oil, and other inflammables, and which will automatically close when a predetermined temperature is exceeded, as in the case of fire, to shut off the supply of the gas, oil, or other inflammable.

It is desirable in a check valve of this character to have the latch that normally holds the valve closure in open position housed within the body of the valve so that it cannot be tripped accidentally or by unauthorized persons. It is also desirable to have the temperature-responsive means located on the exterior of the valve body so as to be highly sensitive to surrounding temperatures. It is also desirable to provide an operative connection between the external temperature-responsive means and the internally located latch and to have it so arranged that when the temperature-responsive means is fused or otherwise actuated to cause the latch to release the valve closure, egress through the wall of the body around the connecting means is effectively prevented so that gas, oil, or other inflammable cannot escape therethrough.

In a valve of this character it is likewise desirable to be able to replace the external fusible temperature-responsive means and to be able to reset the valve without opening the valve body so that if required the valve may be reset while it is under operating pressure without involving leakage therefrom.

One object of the present invention is to provide an improved valve which will meet with all of the above-mentioned requirements.

Another object of the present invention is to provide an improved check valve wherein the body of the check valve provides a valve seat against which a valve closure is swingable. This valve closure is mounted for swinging movement on a rotatable pintle a portion of which is non-circular in cross-section and which has clearance spaces between its sides and the valve closure that are in the direction of seating movement of the valve closure when the closure is about to seat, thus enabling the closure to accommodate itself or adjust itself with respect to the seat on closing. Heretofore, self-adjustable closures have been provided for check valves wherein the closure has an adjustable connection with the arm on which it is swung. I find, however, that with such arrangements on closing, one portion of the closure frequently encounters

2 the valve seat first and in a relatively small number of operations the valve seat tends to become pounded or peened by the valve closure. By having the closure rigid with the arm and having the arm adjustable with relation to the pintle on which it is swung, I find that the closure will adequately adjust itself to the seat and that intense or concentrated pounding or peening of the seat by the closure is at least greatly reduced, if not entirely eliminated.

With the foregoing and other objects in view, which will be made manifest in the following detailed description and specifically pointed out in the appended claims, reference is had to the accompanying drawings for an illustrative embodiment of the invention, wherein:

Figure 1 is a longitudinal vertical section through the improved check valve illustrating the closure in the open or normal position;

Fig. 2 is a similar view, illustrating the valve as having been tripped to allow the closure to close; and Fig. 3 is a vertical section taken substantially upon the line 3—3 upon Fig. 2.

Referring to the accompanying drawings wherein similar reference characters designate similar parts throughout, 10 indicates the body of the improved check valve which is internally threaded at its ends to be connected in a conduit, such as a pipe line, wherein the pipe 11 constitutes the inlet leading into the body and the pipe 12 constitutes the outlet leading therefrom. Shortly in advance of the outlet the body provides a valve seat 13 for a valve closure 15 that is rigidly mounted upon an arm 16. A pintle 17 extends transversely across the body and is rotatable with respect thereto. The central portion of this pintle is non-circular in form as indicated at 18. One end of the pintle indicated at 19 is of reduced diameter and is rotatably mounted in a boss formed integral with the wall of the body 10. The other end of the pintle 17 is cylindrical in form and extends through packing 20 adapted to be compressed about the pintle by means of a nut 21. The outer end of the pintle is squared as at 22 for the application of a key or wrench by which the pintle can be turned in resetting the valve on removal of a cap 23. The arm 16 and the valve closure 15 may swing downwardly into engagement with the seat 13 by gravity. However, I preferably employ a coil spring 24, portions of which are wrapped around the pintle with one end bearing against a wall of the body 10 and the other end bearing on top of the arm. This spring may assist gravity in urging the valve closure 15 towards its seat 13. The arm 16 carries a hook 25 engageable by a hook 26 on a latch 27 that is pivotally mounted on one or more ears 28 formed on one wall of the body 10.

In the forward wall of the body 10 there is formed a bore or passage 30, and a wall closure 31 closely fits this passage for sliding movement. This closure is adapted to seat on the inner end of an internal nut 32 but is normally spaced therefrom by means of a stainless steel pin 33 extending through the nut. On the outer side of the nut there is positioned a heat-insulating gasget 34 that is retained in position by means of a cap 35 that is secured to the nut such as by screws 36. This cap has a central aperture 37 formed therein into which the end of the stainless steel pin 33 extends. Its outer face is countersunk or recessed and is filled with a fusible metal 38 designed to melt at a predetermined temperature. The inner end of the wall closure 31 has a stem 39 about which is disposed a relatively stiff helical spring 40, the outer end of which is anchored such as by soldering or brazing. A much weaker compression spring 42 is compressed between the head of the wall closure 31 and an internal shoulder or flange 43 formed on the inner end of the passage.

Under normal temperatures the fusible metal 38 forms an obstruction preventing outward movement of the stainless steel pin 33 and thus retains the wall closure 31 in the position illustrated in Fig. 1. In this position the spring 40 exerts sufficient pressure on the latch 27 to keep the hooks 25 and 26 in engagement thus holding the valve in open position. When the surrounding or external temperature exceeds the melting point of the fusible metal 38, such as may be occasioned by an adjacent fire, the fusible metal fuses and allows the pin 33 to be forced outwardly. This outward movement is urged by the compression of both springs 42 and 40. However, as soon as this movement is commenced the stiffness of the spring 40 is such that it quickly disengages the latch and the outward movement is completed by the spring 42. During the outward movement the anchored spring 40 is carried with the wall closure 31 into the passage 30, as illustrated in Fig. 2. When the latch 27 is thus released the surfaces of the mutually engaged hooks 25 and 26 are such that the latch 27 will be cammed out of the path of the hook 25 allowing the valve closure 15 to close on its seat 13. The outward movement of the valve closure 31 is ultimately limited by its engagement with the inner end of the nut 32 so that leakage from the interior of the body around the wall closure 31 and through the passage previously occupied by the pin 33 is effectively prevented.

As will be noted, there are clearance spaces 44 and 45 between the sides of the non-circular portion of the pintle 17 and the knuckles on the arm 16. These clearance spaces are present on those sides of the pintle 17 which are in the direction of the closing movement of the closure 15 as it approaches its seat 13. Consequently as the closure 15 reaches its seat 13 these clearances 44 and 45 will enable the closure and its rigidly attached arm 16 to adjust themselves with relation to the pintle 17 so that the closure 15 will accommodate itself to its seat to prevent leakage.

When it is desired to re-seat the valve, this may be accomplished even though pressure exists in the inlet 11 and within the body 10 without involving leakage from the valve. A new cap 35 is provided equipped with a new supply of fusible metal 38, or a new supply of fusible metal 38 may be flowed into the recess in the old cap. The stainless steel pin 33 is ordinarily recoverable and is again introduced through the gasket 34 and through the nut 32, returning the wall closure 31 to the position shown in Fig. 1. The cap 35 is then re-applied by means of its screws 36 to hold the pin 33 in this position. When the wall closure 31 is thus restored, its spring 40 will swing the latch 27 into its initial position. The cap 23 may then be removed and a wrench or key applied to the squared portion 22 to rotate the pintle 17 and thus restore the arm 16 and closure 15 to the position shown in Fig. 1. In so doing the hook 25 merely cams the hook 26 against the action of the compression spring 40 until the hooks again mutually engage and when the hooks are thus engaged the re-seating is completed except for the re-application of the cap 23.

It will be noted that when the valve is tripped due to the predetermined temperature being exceeded, egress from the body of the valve is prevented due to the fact that fluid within the body cannot escape around the wall closure 31. Even during the replacement of the cap 35, leakage around the wall closure 31 is effectively prevented. The construction is advantageous in that the temperature responsive means provided by the fusible metal 38 is located on the exterior of the valve where it is directly subjected to the surrounding temperature. It is consequently more sensitive than if the temperature responsive means were located within the body 10 and the temperature conducted thereto by conduction through the wall of the body. It is advantageous to employ a heat insulating gasket 34 to isolate the cap 35 from the body of the valve as much as possible so that in the event a hot fluid, such as hot oil, is passing through the valve its temperature will not be effective to any marked extent on the fusible metal 38.

The design as above described is also highly advantageous in that the latch is located entirely within the body and cannot be actuated or tripped by unauthorized persons nor can it be accidentally shifted to release the closure 15. When the closure 15 is in open position, as illustrated in Fig. 1, it is entirely out of the path between the inlet 11 and the outlet 12. Consequently it does not resist flow from the inlet to the outlet while in its normal position. If pipe cleaners are run through the conduit periodically, as is frequently required, these cleaners may pass through the body from the inlet to the outlet without interference or hindrance by the closure 15 while this closure is in its open position.

From the above described construction it will be appreciated that an improved temperature-responsive check valve is provided which is of simple and durable design and which is highly sensitive to temperatures surrounding the check valve, but which is so designed that when the valve is tripped or when it is re-set, it is not necessary to open the valve which would result in the escape of fluid therefrom. These operations may be performed without involving any leakage even though the valve is under high internal pressure. The improved valve is also advantageous in that the adjustment between the arm 16 and the pintle 17 enables the closure 15 to adjust itself with respect to its seat 13 and yet danger of peening or deforming the valve 13 is avoided.

Various changes may be made in the details of construction without departing from the spirit and scope of the invention as defined by the appended claims.

I claim:

1. A check valve comprising a body adapted to be connected in a conduit, a valve seat therein, a closure urged to seat thereon, means for holding the closure open comprising a latch normally urged to release the closure, and a wall closure operatively connected to the latch and slidable in a passage through a wall of the body, a seat therefor in the passage, a cap for the outer end of the passage, a pin extending through the cap and engageable with said wall closure to hold the wall closure away from its seat and in a position wherein the latch will be held in a position holding the first-mentioned closure open, and means on the outer end of the cap for retaining said pin in position in the cap until a predetermined temperature is exceeded, and then allowing the pin to be forced outwardly therethrough allowing the wall closure to seat and allowing the latch to release the first mentioned closure.

2. A check valve comprising a body adapted to be connected in a conduit, a valve seat therein, a closure urged to seat thereon, means for holding the closure open comprising a latch normally urged to release the closure, and a wall closure operatively connected to the latch and slidable in a passage through a wall of the body, a seat therefor in the passage, a cap for the outer end of the passage, and means mounted on the cap extending into the passage holding the wall closure away from its seat and in a position wherein the latch will be held in a position holding the first-mentioned closure open until a predetermined temperature is exceeded, and then allowing the wall closure to seat, thus causing the latch to release the first-mentioned closure.

3. A check valve comprising a body adapted to be connected in a conduit, a valve seat therein, a closure urged to seat thereon, there being an opening in the wall of the body, an inwardly facing valve seat in said opening, a wall closure urged to seat on the last mentioned seat, means operatively connecting the wall closure to the first mentioned closure to hold the first mentioned closure open, means movably extending through the wall of the body and through the seat in said opening for holding the wall closure in unseated position, and means for holding the last mentioned means against outward movement through the opening until the occurrence of a certain event and then releasing it for outward movement allowing the wall closure to seat and the first mentioned closure to close.

4. A check valve comprising a body adapted to be connected in a conduit, a valve seat therein, a closure urged to seat thereon, there being an opening in the wall of the body, an inwardly facing valve seat in said opening, a wall closure urged to seat on the last mentioned seat, means operatively connecting the wall closure to the first mentioned closure to hold the first mentioned closure open, means movably extending through the wall of the body and through the seat in said opening for holding the wall closure in unseated position, and means responsive to temperature for holding the last mentioned means against outward movement through the opening until a predetermined temperature is exceeded and then releasing it for outward movement allowing the wall closure to seat and the first mentioned closure to close.

5. A check valve comprising a body adapted to be connected in a conduit, a valve seat therein, a closure urged to seat thereon, there being a passage through the wall of the body, a valve seat therein, a wall closure urged to seat outwardly against the last mentioned seat, a latch within the body adapted to hold the first mentioned closure open, means operatively connecting the wall closure to the latch to allow the latch to release the first mentioned closure when the wall closure is seated and to cause the latch to hold the first mentioned closure open when the wall closure is unseated, a pin slidably extending through the passage, and means disposed externally of the body for holding the pin in wall closure unseating position until the happening of a certain event and then allowing the wall closure to seat and the latch to release the first mentioned closure.

6. A check valve comprising a body adapted to be connected in a conduit, a valve seat therein, a closure urged to seat thereon, there being a passage through the wall of the body, a valve seat therein, a wall closure urged to seat outwardly against the last mentioned seat, a latch within the body adapted to hold the first mentioned closure open, means operatively connecting the wall closure to the latch to allow the latch to release the first mentioned closure when the wall closure is seated and to cause the latch to hold the first mentioned closure open when the wall closure is unseated, a pin slidably extending through the passage, and temperature responsive means exposed on the exterior of the body for holding the pin in wall closure unseating position and adapted upon a certain temperature being exceeded to release the pin for outward sliding movement allowing the wall closure to seat and the latch to release the first mentioned closure.

7. A check valve comprising a body adapted to be connected in a conduit, a valve seat therein, a closure urged to seat thereon swingably mounted in the body, means enabling the closure to be swung into open position operable from the exterior of the body without opening the body to egress from its interior, a latch within the body engageable with the closure to hold it in open position when swung thereto, there being an opening in the wall of the body adjacent the latch, means providing an inwardly facing valve seat disposed in said opening, a wall closure in the opening urged to seat on the valve seat, a pin slidably extending through the valve seat and substantially filling it, a cap detachably mounted on the outer end of the valve seat, means on the cap responsive to the occurrence of a certain event for holding the pin in wall closure unseating position until the occurrence of the event and then releasing the pin to allow the wall closure to seat, and means connecting the wall closure to the latch for causing the latch to hold the first mentioned closure open until the wall closure seats and then allowing the first mentioned closure to seat.

8. A check valve comprising a body adapted to be connected in a conduit, a valve seat therein, a closure urged to seat thereon swingably mounted in the body, means enabling the closure to be swung into open position operable from the exterior of the body without opening the body to egress from its interior, a latch within the body engageable with the closure to hold it in open position when swung thereto, there being an opening in the wall of the body adjacent the latch, means providing an inwardly facing valve seat disposed in said opening, a wall closure in the opening urged to seat on the valve seat, a pin slidably extending through the valve seat and substantially filling it, a cap detachably mounted on the outer end of the valve seat, means on the cap responsive to the occurrence of a certain event for holding the pin in wall closure unseating position until the occurrence of the event and then releasing the pin to allow the wall closure to seat, and means connecting the wall closure to the latch for causing the latch to hold the first mentioned closure open until the wall closure seats and then allowing the first mentioned closure to seat, the wall closure substantially filling the opening in the wall of the body when in unseated position.

9. A check valve comprising a body adapted to be connected in a conduit, a valve seat therein, a closure urged to seat thereon swingably mounted in the body, means enabling the closure to be swung into open position operable from the exterior of the body without opening the body to egress from its interior, a latch within the body engageable with the closure to hold it in open position when swung thereto, there being an opening in the wall of the body adjacent the latch, means providing an inwardly facing valve seat disposed in said opening, a wall closure substantially filling said opening inwardly of the valve seat and urged to seat on the valve seat, a pin slidably extending through the valve seat and substantially filling it, a cap detachably mounted on the outer end of the valve seat, temperature responsive means externally exposed on the cap for holding the pin in wall closure unseating position until a predetermined temperature is exceeded and then releasing the pin to allow the wall closure to seat, and yieldable means connecting the wall closure to the latch for causing the latch to hold the first mentioned closure open until the wall closure is allowed to seat and then allowing the first mentioned closure to seat.

10. A valve comprising a body adapted to be connected in a conduit, a valve seat therein, a closure urged to seat on the valve seat swingably mounted in the body, latch means movably mounted within the body engageable with the closure to releasably hold the closure open, the latch means being normally urged to release the closure, means for causing the latch means to assume a position holding the closure open comprising a wall closure slidable in an opening in a wall of the body engageable with the latch means, means limiting outward movement of the wall closure in said opening, a pin slidable in said means engageable with the wall closure to hold the wall closure in a normal position inwardly of its outermost position, and means engageable with the outer end of the pin for releasably holding the pin in its normal position until the occurrence of a certain event and then releasing the pin and wall closure for outward movement, thus allowing the latch means to release the first-mentioned closure and permit it to close.

FRED W. McRAE.

REFERENCES CITED

The following references are of record in the file of this patent:

UNITED STATES PATENTS

| Number | Name | Date |
|---|---|---|
| 226,059 | Gillette | Mar. 30, 1880 |
| 496,045 | Dinsmore | Apr. 25, 1893 |
| 709,262 | Gold | Sept. 16, 1902 |
| 1,603,123 | Kuehne | Oct. 12, 1926 |
| 1,620,876 | Currivan | Mar. 15, 1927 |
| 1,742,043 | McGee | Dec. 31, 1929 |
| 1,746,801 | Sieden | Feb. 11, 1930 |
| 1,892,921 | White | Jan. 3, 1933 |
| 1,897,678 | Schiorring | Feb. 14, 1933 |
| 2,282,532 | Shenk | May 12, 1942 |
| 2,327,055 | McMahon | Aug. 17, 1943 |